(12) United States Patent
Stewart, Jr.

(10) Patent No.: US 6,871,914 B2
(45) Date of Patent: Mar. 29, 2005

(54) KIT FOR PROTECTING THE RIM OF A WHEEL DURING APPLICATION OF A LIQUID TO THE TIRE THEREOF

(76) Inventor: George Stewart, Jr., 7606 Tully, Houston, TX (US) 77016

( * ) Notice: Subject to any disclaimer, the term of this patent is extended or adjusted under 35 U.S.C. 154(b) by 0 days.

(21) Appl. No.: 10/371,024

(22) Filed: Feb. 20, 2003

(65) Prior Publication Data

US 2004/0164607 A1 Aug. 26, 2004

Related U.S. Application Data

(60) Provisional application No. 60/370,378, filed on Apr. 5, 2002.

(51) Int. Cl.$^7$ .................................................. B60B 7/00
(52) U.S. Cl. ............................. 301/37.104; 301/37.103; 301/37.104
(58) Field of Search ...................... 301/37.101, 37.23, 301/37.26, 37.102, 37.103, 37.104, 37.42, 37.106; 118/504, 505

(56) References Cited

U.S. PATENT DOCUMENTS

| 3,264,036 | A | * | 8/1966 | Wise | 301/37.26 |
|---|---|---|---|---|---|
| 3,279,860 | A | * | 10/1966 | Wise | 301/37.32 |
| 3,432,206 | A | * | 3/1969 | Spisak | 301/37.26 |
| 4,295,685 | A | * | 10/1981 | Spisak | 301/37.42 |
| 4,811,991 | A | | 3/1989 | Moreno et al. | |
| 4,874,206 | A | * | 10/1989 | Sampson | 301/37.103 |
| 4,955,670 | A | * | 9/1990 | Koller | 301/37.31 |
| 5,423,599 | A | * | 6/1995 | Sherod et al. | 301/37.103 |
| 5,820,225 | A | * | 10/1998 | Ferriss et al. | 301/37.371 |
| 6,068,345 | A | | 5/2000 | Bressie | |

* cited by examiner

Primary Examiner—Russell D. Stormer
(74) Attorney, Agent, or Firm—Jackson Walker LLP

(57) ABSTRACT

This invention relates to a kit for using with a wheel, to cover the rim of the wheel when one desires to wash or apply a protective finish to the rubber of the tire. Applicant provides a kit. The kith includes a circular, flat base member with a handle extending from the middle of the base member. This base member is dimensioned to cover the rim of smaller diameter wheels. Stubs are provided on the base member to engage holes in a multiplicity of flat disk shaped rings. The disc shaped rings have a greater diameter then the base member and are used for wheels that are too large to be covered by the diameter of the base member. The base member, with any discs attached, is pressed up against the perimeter of the rim of the wheel and will effectively mask the rim of the tire while the liquid can be applied to the rubber of the tire without any splashing under the rim.

5 Claims, 7 Drawing Sheets

KIT FOR PROTECTING THE RIM OF A WHEEL DURING APPLICATION OF A LIQUID TO THE TIRE THEREOF

This application claims benefit of Provisional Application Ser. No. 60/370,378, filed on Apr. 5, 2002.

FIELD OF THE INVENTION

This invention relates to a wheel mask and more particularly to an improved tire wheel and wheel cover spray shield.

BACKGROUND

Automobile tires are generally mounted to wheels. For appearance sake, motorists often spray the rubber tire vehicles with a protective shiny finish or coating or otherwise attempt to clean the rubber tires.

Accordingly, there is a need for a protective removable shield that will prevent the wheels or wheel covers from being sprayed or covered undesirably when rubber tires mounted on the wheels are being sprayed with a protective shiny coating, washed or otherwise having liquid applied thereto. Such a shield or mask preferably should be easy to put in place and held in place and easily removed and should be available in various diameters to fit various size wheels and wheel covers.

While the prior art illustrates a number of such shields, only a few are provided with the ability to cover wheels of varying diameters. For example, U.S. Pat. No. 4,874,206 discloses such a wheel rim mask or shield that includes a core that has peripheral hooked rims attachable thereto.

However, Applicant provides a number of advantages in his novel disc shaped members, including the ability to provide firm, positive support to additional rings that are provided to a basic disc so as to allow the kit to mask rims of two or more different radii.

SUMMARY OF THE INVENTION

Applicant's novel kit consists of a multiplicity of disc shaped members designed as protective covering for a variety of rims of cars, that is, rims having differing diameters, to be used when washing a car and applying a tire coating to protect the rims from overspray or splash from coating or cleaning chemicals.

Applicant's novel kit is provided in three embodiments disclosed herein. In the first embodiment, Applicant provides for a base member, flat disc shaped with a handle protruding therefrom. The flat disc member also has mounting stubs projecting in the same direction as the handle, from the outer surface of the base member. The base member has a diameter that is about equal to the diameter of the smallest wheel of the set of wheels to be covered by the kit. Secondary members may be attached to be flush with the outer surface of the base member and mounting stubs, with a hole cut out for the mounting stubs and the for the centrally located handle to project through the flush mounted secondary member. With such a device, one may engage the hand to the handle and press or urge the secondary member up against the outer surface of the base member and hold the unit against the wheel to mask off the wheel. Providing a number of secondary members all having differing radii than the base member one can provide a kit that will cover a number of different sized vehicle wheels.

Applicant provides two forms of a second embodiment of a kit, the second embodiment of a kit having additional ring or disc shaped members which engage, by various means, the inner surface of a base member to allow the user to accommodate larger diameter wheels. Thus, the user of the second embodiment of Applicant's present invention may urge the base member against the wheel and the larger ring or disc shaped member will be "sandwiched" by the pressure of the user, between the rim of the wheel and the base member, to help hold it in place. In one form of the second embodiment, the base member engages the larges diameter rings or discs through a series of tongues and grooves. A second manner of providing extension rings is to use mounting stubs on the base member and matching holes in the ring.

The covers may be produced from plastic, metal or other suitable material with the multiplicity of discs ranging, for example from 13" in diameter, 14" in diameter, up to 20" or more in diameter. Each disc may have a thin rubber perimeter so as to effectively mate with the rim of the wheel. For example, with the 15" wheel, Applicant's may use a 15" disc, for a 16" rim, Applicant would use the 16" ring from the kit.

The base disc is equipped with a handle for holding the unit against the perimeter of the rim while the protective coating or cleaning chemical is applied to the tire. This effectively eliminates the need to wipe down the rim and hub cap following spraying or application of the chemical to the rubber of the tire.

Applicant's novel kit would reduce the amount of wheel cleaning required and protect the rims from over spray. No longer would a car owner have to wipe down the rim and hub cap following application of the cleaner or protectant to the tire. Instead, he would simply place the appropriate sized cover against the rim while applying chemicals to the tire. The cover would prevent chemicals or soaps from accumulating in openings etc. on the expensive rims and therefore would prevent long term chemical build up. This saves the vehicle owner a great deal of time. This product would be lightweight and durable for years of effective use. Being a kit, it may be adapted to use for vehicles with larger rims for example a truck, without having to buy separate sized wheel discs, as are provided in the prior art. This product would appeal to private car owners as well as owners of car wash facilities and auto detailing businesses.

For treating the tires of a car, the motorist will typically spray a chemical coating or protectant on a tire. During the spraying or application process, chemicals may accumulate on the rim or hubcap as well as the tire. As a result the consumer has to use a towel to wipe them off-this can be tedious. Applicant has provided a kit including a multiplicity of discs which are adapted to be received on a disc shaped base member, for treating wheels of differing diameters.

A number of others provide inventions with structure or function designed to achieve the same results as Applicant's invention, but have a number of disadvantages. These patents include U.S. Pat. No. 5,423,599 (Sherod 1995), U.S. Pat. No. 6,068,345 (Brezzie 2000), and U.S. Pat. No. 4,811, 991 (Moreno 1989). However, none of these inventions provide the novel kit containing the multiplicity of disc shaped members, which are easily joined to a base disc, for use with a multiplicity of vehicles, which vehicles have different rim sizes.

BRIEF DESCRIPTION OF THE DRAWINGS

FIG. 1 is a side elevational view of the base member with a secondary member engaged therewith.

FIG. 2 is a top elevational view of the base member.

FIG. 3 is a side elevational view of the base member.

FIG. 4 is a side elevational view of the base member perpendicular to the view set forth in FIG. 3.

FIG. 5 is a perspective view from the top of the base member of Applicant's present invention.

FIG. 6 is a perspective view of the first embodiment of Applicant's present invention showing a secondary member attached to the base member.

FIG. 7 is a bottom elevational view of the illustration set forth in FIG. 6.

FIG. 8 is a side elevational view showing how a base member and a ring member engage.

FIG. 9 is a top elevational view of the base member with a secondary ring attached thereto.

FIG. 10 is a side elevational view cutaway showing how the ring member engages the base member.

FIG. 11 is an exploded perspective view showing the base member exploded from the ring member.

FIG. 12 is a perspective view of the base member with a ring member attached thereto.

FIG. 13 is a top elevational view of the embodiment set forth in FIG. 12.

FIG. 14 is a perspective view of a ring member engaged with a base.

FIG. 15 is a perspective view of one of a multiplicity of ring members for engaging a base member set forth in FIG. 14.

FIG. 16 is an exploded view is side elevation illustrating the manner in which one of the ring members may engage a base member.

DETAILED DESCRIPTION OF THE PREFERRED EMBODIMENT

FIGS. 1 through 7 illustrate a kit 10, the kit having a disc shape base member and a multiplicity of other discs (one shown in FIG. 1), such other discs joinable to the base member, for protecting the rim of a wheel while cleaning or applying a liquid protectant to the tire of the wheel.

Figure 1:
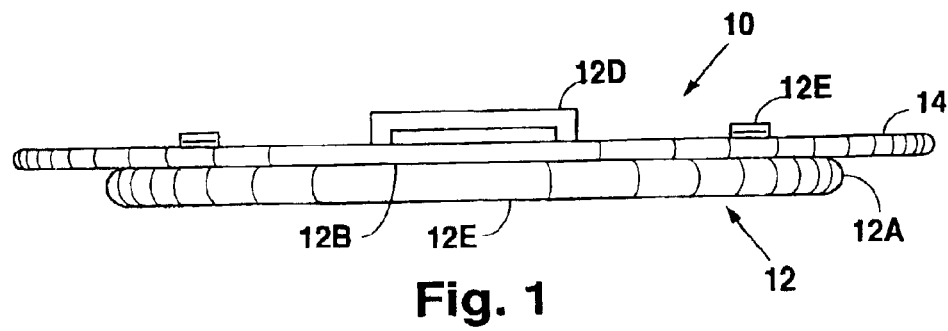
FIGS. 1 through 7 illustrate the first embodiment of Applicant's present invention.

Turning, for example, to FIG. 1 it is seen that Applicant provides a kit 10, the kit including a cylindrical disc shaped, flat base member 12, comprised of plastic, steel, aluminum or other suitable material. The base member has a perimeter 12A which may be, for example 1/16"–1/4" thick, and a first surface 12B and a second surface 12C. The two surfaces are typically flat and parallel to each other and spaced apart by perimeter 12A.

Figure 2:
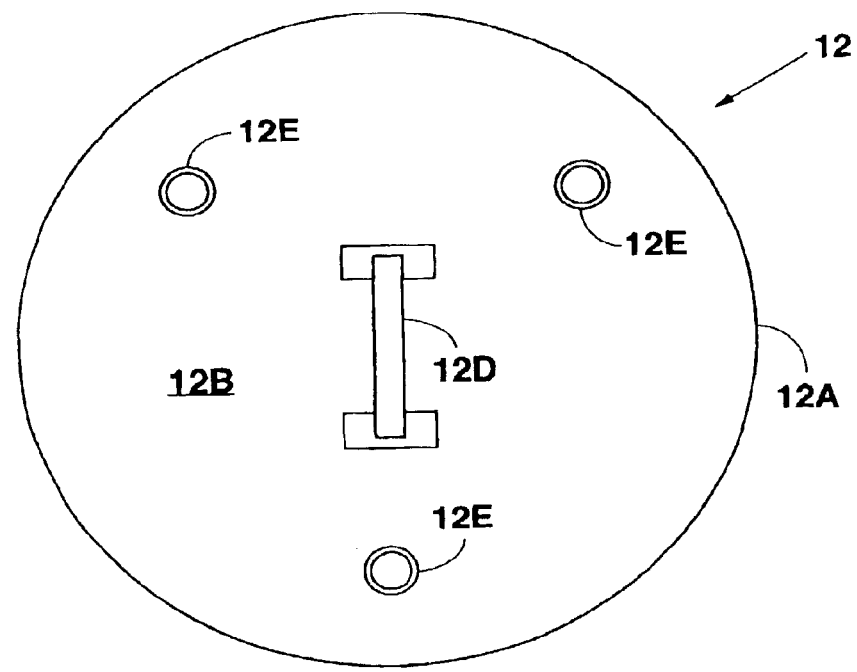
Figure 3:
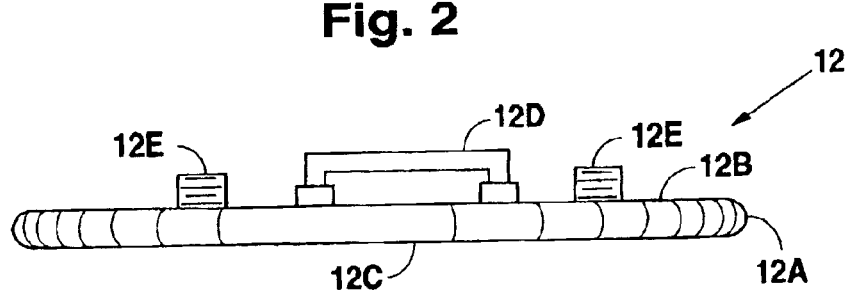
Figure 4:
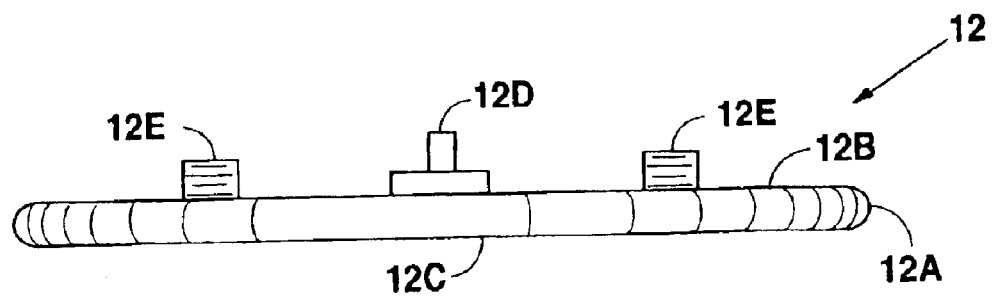
Figure 5:
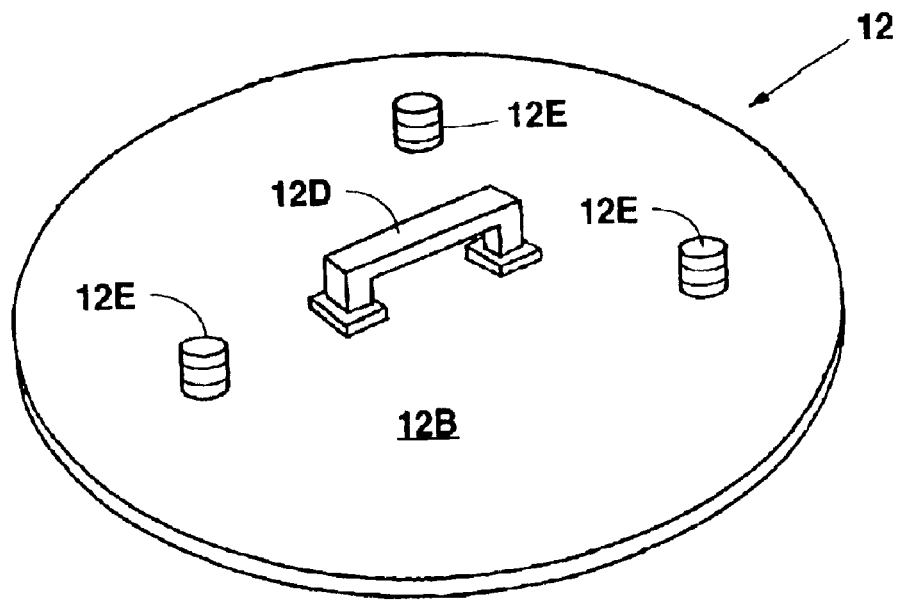

FIGS. 2 and 5 illustrate additional features of Applicant's disc shaped base member 12. More particularly, these illustrate that projecting above the first surface of the base member is a suitable, centrally located, handle 12D capable of receiving a hand between the body of the disc and the upstanding handle. The handle may be attached to the body of the disc shaped member by any suitable means (screws, pop rivets, glue, etc.). Also seen vertically projecting above the first surface of the disc shape member are a multiplicity (here three) of mounting stubs 12E. Mounting stubs 12E may be mounted to the disc shape member any suitable fashion. The function of the mounting stub is to engage secondary and tertiary discs (or other additional) members to the base member, so the device may be used to mask wheels of a diameter greater than the diameter of the loose member.

Figure 6:
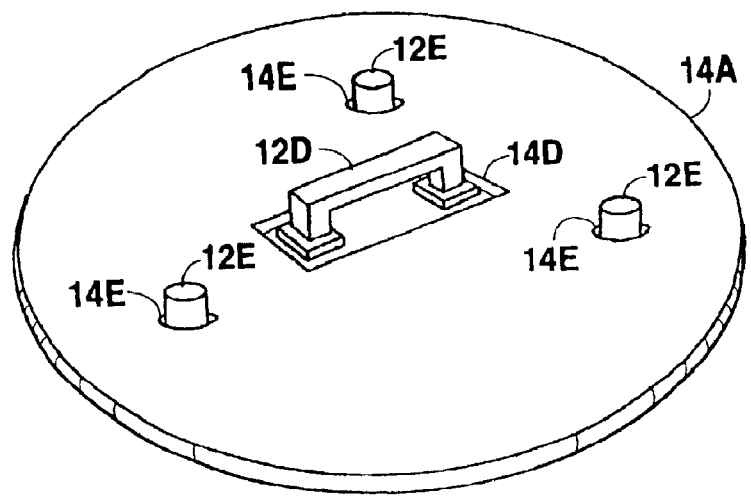
Figure 7:
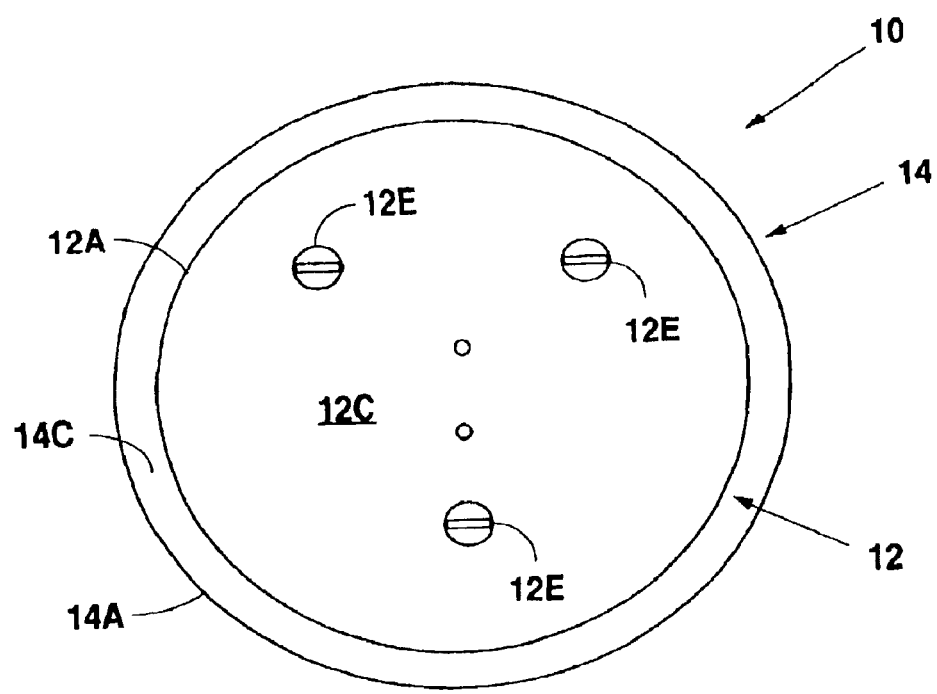
Figure 8:
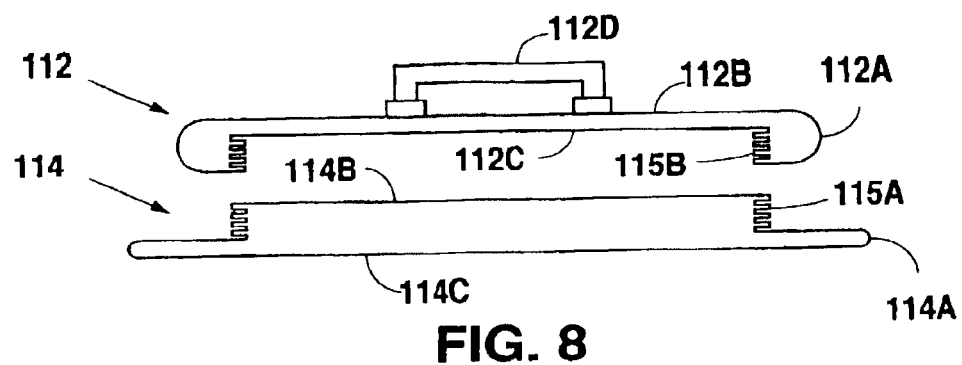
FIGS. 8 through 13 illustrate a second embodiment of Applicant's present invention.
Figure 9:
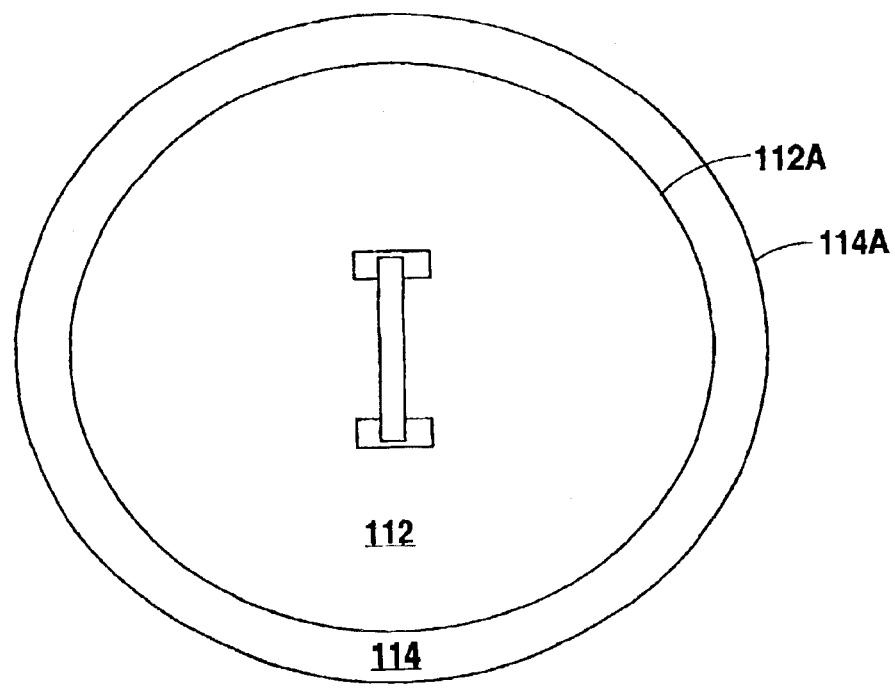
Figure 10:
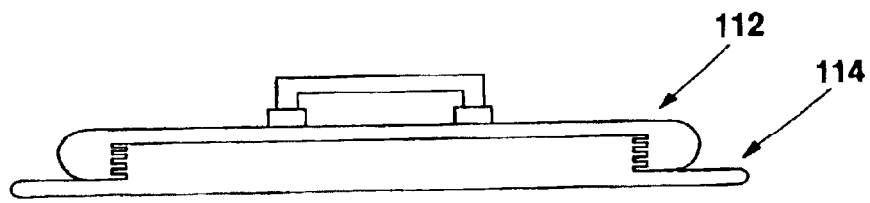
Figure 11:
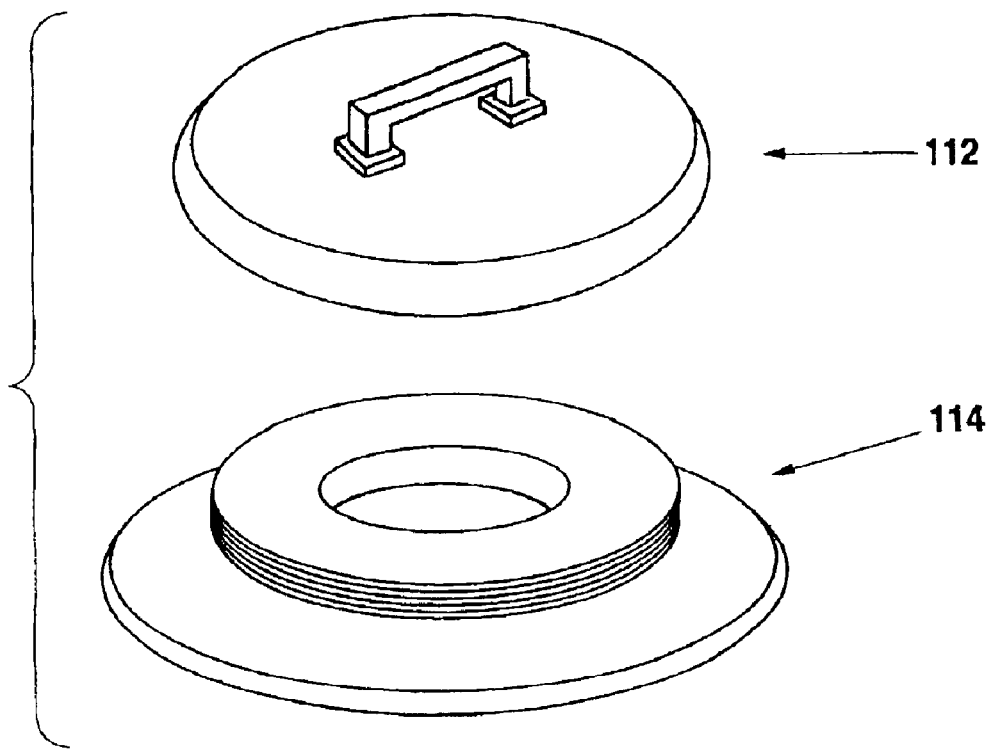

Turning now to FIGS. 6 and 7 it is seen that Applicant's provide a disc shape secondary member 14 having a diameter greater than the diameter of the base member. For example, if the base member has diameter of 15" and thus accommodates a 15" rim of a wheel, disc shape secondary member may have a diameter of 16" and therefore may accommodate a 16" wheel.

It is seen that secondary member 14 has a perimeter 14A thereupon, a first surface 14B and a second 14C. The second surface 14C is seen to made flush with the first surface 12B of the base number when the secondary member is mounted thereto. Mounting may be achieved, for example, by providing in the secondary discs a cut out 14D for snug receipt of handle 12D therethrough as well as a plurality of holes 14E for snug receipt and acceptance of mounting stubs 12E thereinto. This mounting arrangement provides a number of advantages. First it provides for flush engagement with a first surface of a secondary disc against the first surface of the primary disc or base member for unity and rigidity. Second, it provides that when one's hand is engaged with handle 12D the hand may also be urged against the first surface 14B of secondary member 14 in such a fashion as to urge the secondary member against the base member and thereby provide rigidity and unity to hold the perimeter 14A of secondary member 14 against the rim of the wheel. Note also that holes 14E will provide alignment of the two discs so as to prevent relative sliding or twisting between them and misalignment with the rim of the wheel.

FIGS. 8 through 13 illustrate a second embodiment of Applicant's present invention. In this embodiment, a base member 112 having a perimeter 112A, a top surface 112B and a bottom surface 112C, has a handle 112D projecting therefrom. It is designed to engage with one of a multiplicity of secondary rings 114, each of the secondary rings having a perimeter 114A, a top surface 144B and a bottom surface 144C. Note that the perimeter of secondary disk 114 defines a radius that is greater than that defined by perimeter 112A. Means of engagement between the base and the ring member are typically tongues 115A mating with grooves 115B (see FIGS. 8 and 10). Thus, this provides positive engagement between the ring member and the base member.

For all of these embodiments, a base member may have a diameter of about 13" to accommodate both 12" and 13" rims (without using any secondary rings). Typically, two or three additional secondary rings will be provided. For example, one may be provided with an outside diameter of about 15" to cover 14", 15" and 16" rims. The second ring may be added with a diameter of about 17" to cover 16" and 17" rims. Yet a third may be provided with an outside diameter of about 20" that would cover 18" to 20" rims.

Figure 12:
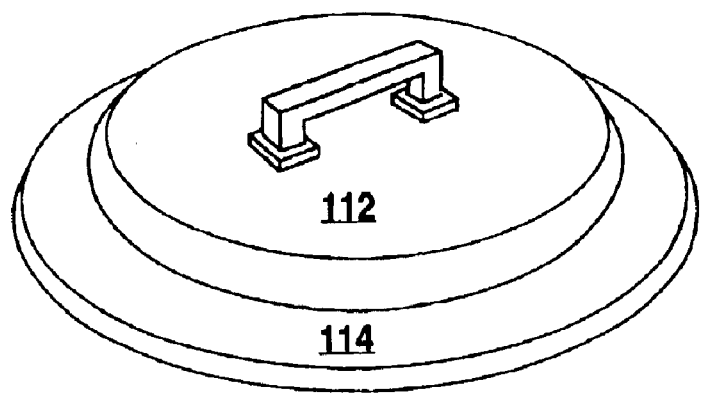
Figure 13:
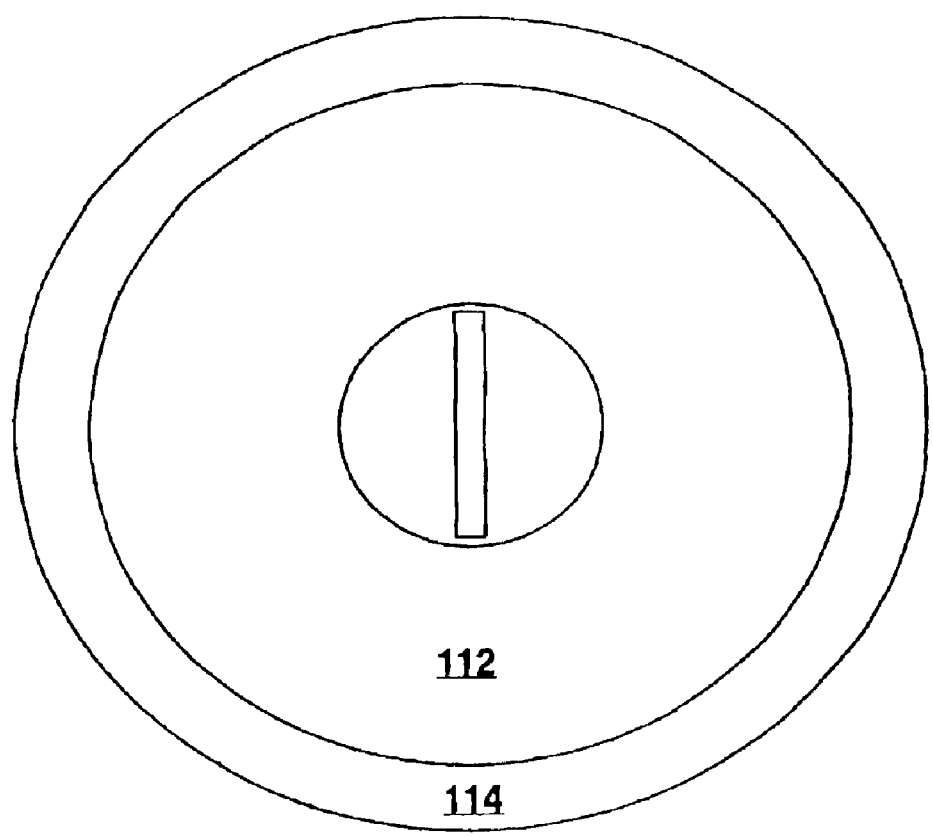
Figure 14:
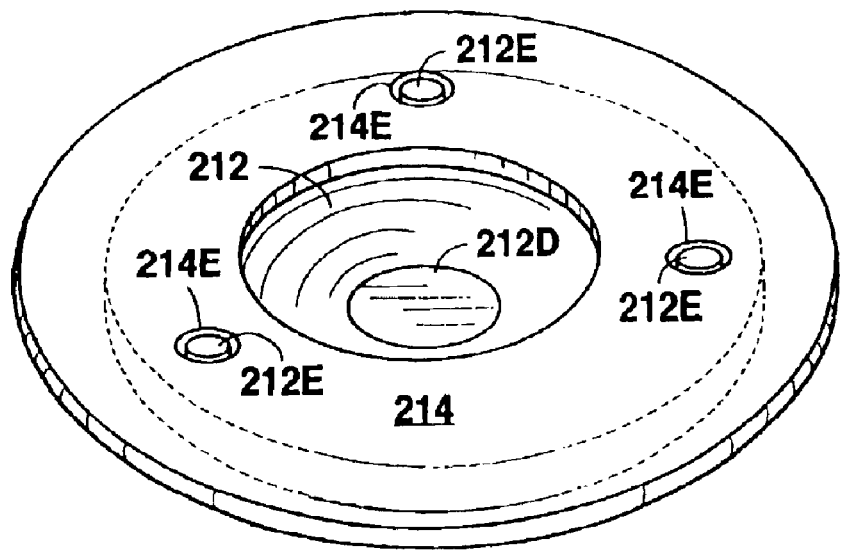
FIGS. 14, 15 and 16 illustrate a third embodiment of Applicant's present invention, wherein the means to engage a ring with a base member includes stubs projecting from the base member for engaging holes in the ring member.

The secondary rings may be solid (as a disc) or have an inner cutout that would define walls having an inner diameter of less than the outer diameter of the base so as to provide overlap as illustrated in FIGS. 12, 13 and 14. Applicant may also provide a kit that could include a common base and any one ring or a common base with two or more secondary rings or disks.

Figure 15:
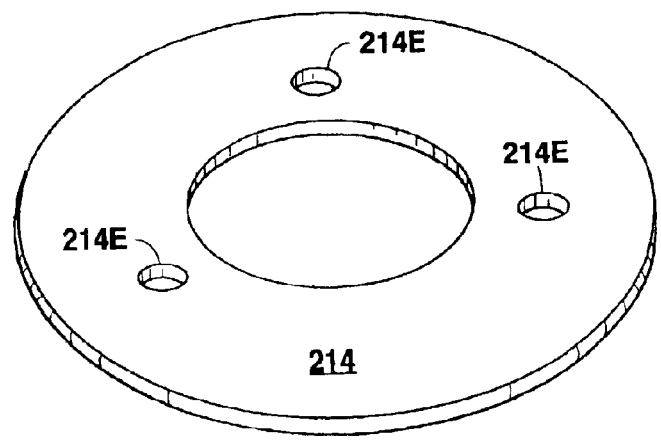
Figure 16:
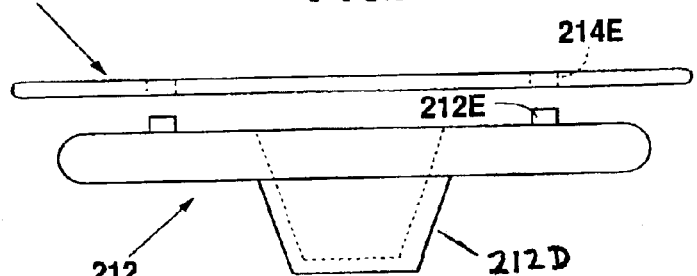
Figure 17:
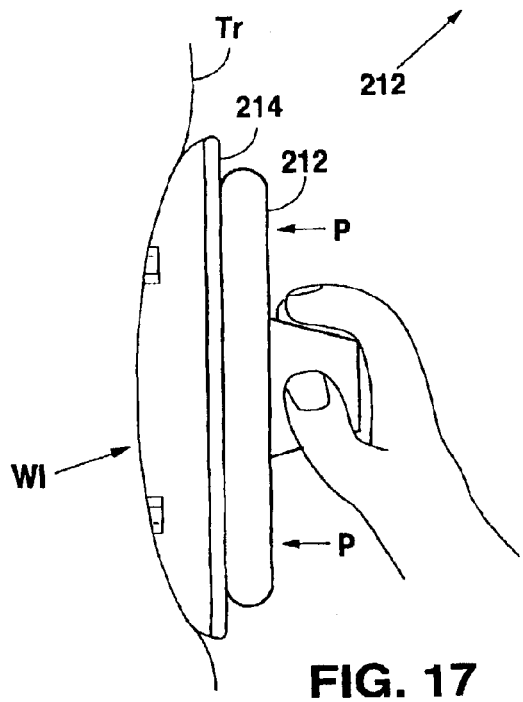
FIG. 17 is a side elevational view of Applicant's invention in use.

FIGS. 14–17 illustrate yet another embodiment of Applicant's present invention which, like the embodiment set forth in FIGS. 8 through 13, "sandwiches" a secondary ring or disk between the base and the wheel cover as illustrated in FIG. 17. FIG. 17 shows a wheel WL with a tire TR mounted thereto and Applicant's invention incorporating a base member engaging a secondary ring or disk wherein a user grasps the handle 212D and, with a secondary ring or disk 214 engaged with base 212, applies pressure P against the rim of wheel WL with one hand and applies cleaner or other fluids to the sidewall of the tire TR. FIGS. 14 through 16 show how secondary ring or disk 214 may include holes 214E for engaging stubs 212E of the base member such that an outer surface of the ring is flush against the inner surface of the base member. The base member may be plastic and molded as a single, integral unit. The handle may be shaped like a truncated cone, widest where engages a planar surface of the base.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

I claim:

1. A kit for protecting the rim of wheel while cleaning or applying a liquid to the tire of the wheel, the kit comprising:
   a disc shaped base member having a perimeter, a first surface and a second surface, and a diameter, the first surface having a centrally located handle projecting therefrom, the base member also including a multiplicity of mounting means located thereon;
   a disc shaped secondary member having a perimeter, a first surface and a second surface and a diameter of at least 13", the diameter of the secondary member being greater than the diameter of the base member, the secondary member including means to engage the mounting means of the base member;
   a disc shaped tertiary member having a perimeter, a first surface and a second surface and a diameter, the diameter of the tertiary member being greater than the diameter of the secondary member, the tertiary member including means to engage the mounting means of the base member; and
   wherein the mounting means of the disk shaped base member are stubs and wherein the secondary and tertiary members have an opening centrally located therein for receipt of the handle of the base member therethrough and wherein the secondary and tertiary members include means to engage the mounting stubs such that the second surface thereof is flush with the first surface of the base member.

2. A kit for protecting the rim of wheel while cleaning or applying a liquid to the tire of the wheel, the kit comprising:
   a disc shaped base member having a perimeter, a first surface and a second surface, and a diameter, the first surface having a centrally located handle projecting therefrom, the base member also including a multiplicity of mounting means located thereon;
   a disc shaped secondary member having a perimeter, a first surface and a second surface and a diameter of at least 13", the diameter of the secondary member being greater than the diameter of the base member, the secondary member including means to engage the mounting means of the base member;
   a disc shaped tertiary member having a perimeter, a first surface and a second surface and a diameter, the diameter of the tertiary member being greater than the diameter of the secondary member, the tertiary member including means to engage the mounting means of the base member; and
   wherein mounting means of the base member and the mounting means of the secondary and tertiary members are matching tongue and grooves.

3. A kit for protecting the rim of wheel while cleaning or applying a liquid to the tire of the wheel, the kit comprising:
   a disc shaped base member having a perimeter, a first surface and a second surface, and a diameter, the first surface having a centrally located handle projecting therefrom, the base member also including a multiplicity of mounting means located thereon;
   a disc shaped secondary member having a perimeter, a first surface and a second surface and a diameter of at least 13", the diameter of the secondary member being greater than the diameter of the base member, the secondary member including means to engage the mounting means of the base member;
   a disc shaped tertiary member having a perimeter, a first surface and a second surface and a diameter, the diameter of the tertiary member being greater than the diameter of the secondary member, the tertiary member including means to engage the mounting means of the base member;
   wherein the mounting means of the base member include stubs and wherein the means to engage the mounting means of the base member includes holes in the secondary and tertiary members; and
   wherein the stubs are located on the second surface of the base member and wherein the secondary and tertiary members engage the base member with a portion of their first surfaces flush to the second surfaces of the base member.

4. The kit as described in claim 3 wherein
   the handle of the base is centrally located and has the shape of a truncated cone;
   the perimeter of the base is radiused; and
   the secondary and tertiary members have open areas located inward of the holes.

5. The kit of claim 4 wherein the base member has a diameter of about 13" and the secondary and tertiary members have a diameter of about 15" and about 17" respectively.

* * * * *